J. E. SMITH.
TIRE.
APPLICATION FILED MAR. 26, 1913.

1,086,947.

Patented Feb. 10, 1914.

Inventor
James E. Smith.

Witnesses
H. G. Batchelor
S. J. Lehrer

By Eugene L. Thom
Attorney

UNITED STATES PATENT OFFICE.

JAMES E. SMITH, OF CLINTON, IOWA.

TIRE.

1,086,947.  Specification of Letters Patent.  Patented Feb. 10, 1914.

Application filed March 26, 1913. Serial No. 757,039.

*To all whom it may concern:*

Be it known that I, JAMES E. SMITH, a citizen of the United States, residing at Clinton, in the county of Clinton and State of Iowa, have invented certain new and useful Improvements in Tires, of which the following is a specification.

This invention relates to pneumatic tires having a series of inflatable inner sections provided with valved connections which allow a free circulation of air through the sections, but which, in case of puncture of any of the sections, shuts off the same from the other sections. Thus, only the punctured sections become deflated and the other sections remain inflated, as the air is prevented from escaping from the latter, and the tire is therefore rendered non-collapsible to ordinary punctures, but may be used until the punctured section or sections are repaired or replaced.

The invention has for its object to provide a novel and improved valved connection between the sections as will be hereinafter described in detail and claimed, reference being had to the accompanying drawing in which—

Figure 1:
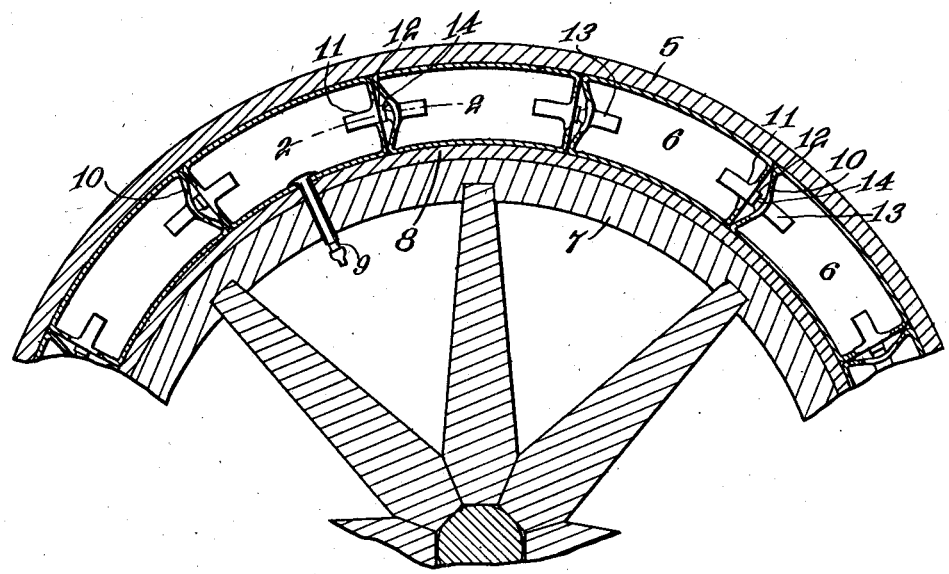
Figure 2:
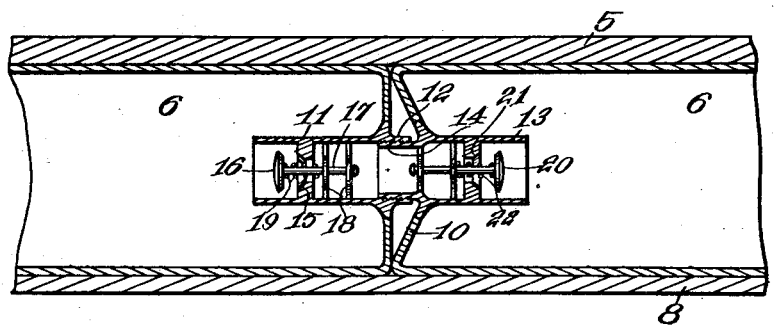

Figure 1 is an elevation of a fragment of a wheel equipped with my improved tire, the latter being shown in section. Fig. 2 is an enlarged horizontal section on the line 2—2 of Fig. 1.

Referring specifically to the drawing the tire comprises an outer casing 5 and a series of inflatable sections 6 inclosed therein. The tire is secured to the felly 7 of the wheel by means of a rim 8 in the ordinary manner. To one of the sections 6 is connected an ordinary inflating valve 9.

All the sections 6, except the one to which the valve 9 is connected, have inward bulges 10 at one end which is for a purpose to be presently described. The sections are placed end to end in the casing 5 and have their ends suitably reinforced with a stiff fabric.

In one end of each section 6 is embedded and secured a tube having a portion 11 which extends into the section and a short portion 12 which projects therefrom and is internally screw-threaded. In the other end of each section is embedded and secured a tube which also projects into the section as indicated at 13, and has a short portion 14 projecting therefrom and screw-threaded externally. The sections are assembled so that the first-mentioned tube of one section is next to and in alinement with the second-mentioned tube of the adjacent section, and the parts 12 and 14 are screwed together. The sections being all connected in this manner, it will be evident that they are intercommunicating, both ends of the connecting tubes being open.

In the portion 12 of the tube is a seat 15 for a valve 16 carried by a stem 17 slidably mounted in guides 18. This valve is normally held open, or off its seat, by a coiled spring 19. The portion 13 of the other tube also has a valve 20 and a seat 21 therefor, this valve being also held open normally by a spring 22.

The valves 16 and 20 all open inward with respect to the sections 6 and as they are normally held open, it will be evident that when the tire is pumped up, all the sections will be inflated simultaneously. The springs hold the valves open when the tire is being pumped up, and as the pressure is equal on both sides of the valves, they remain open. If one of the sections should receive a puncture, the air will rush out of the same, whereupon the valves 16 and 20 of the two adjoining sections, by the pressure in said sections, are at once closed and the air is prevented from escaping from the same and the other sections.

When the punctured section collapses, the two adjacent sections will swell toward each other and thus lessen the depression that may be made in the casing 5 by the collapsed section, the end 10 being forced outward toward the collapsed section.

I claim:

A tire comprising an outer casing, a series of inflatable sections in the casing, each section having mounted in each of its ends a tube having a portion which extends into the section and has its inner end open, said portions being spaced from each other and each tube also having a projecting portion which is open at its outer end, the projecting portion of one tube being internally screw-threaded, and the projecting portion of the other tube being externally screw-threaded for connection with the internally screw-threaded portion of the tube of an adjacent section, and each tube having a valve-seat, a valve for said seat, a stem extending from the valve, guides in the tube for the valve stem, and a spring engageable with the valve for holding the same normally open.

In testimony whereof I affix my signature in presence of two witnesses.

JAMES E. SMITH.

Witnesses:
S. J. LEHRER,
H. G. BATCHELOR.